United States Patent [19]

Gruner

[11] 4,418,329
[45] Nov. 29, 1983

[54] FAST-RESPONSE TEMPERATURE SENSOR

[75] Inventor: Heiko Gruner, Gerlingen, Fed. Rep. of Germany

[73] Assignee: Robert Bosch GmbH, Stuttgart, Fed. Rep. of Germany

[21] Appl. No.: 359,122

[22] Filed: Mar. 17, 1982

[30] Foreign Application Priority Data

Mar. 26, 1981 [DE] Fed. Rep. of Germany ....... 3111948

[51] Int. Cl.³ .............................................. H01C 7/02
[52] U.S. Cl. ....................................... 338/28; 338/25; 338/309
[58] Field of Search .......................... 338/25, 28, 309; 73/362 AR; 29/612, 613

[56] References Cited
U.S. PATENT DOCUMENTS 4,368,453 1/1983 Herder et al. .................. 338/309 X Primary Examiner—C. L. Albritton
Attorney, Agent, or Firm—Frishauf, Holtz, Goodman & Woodward

[57] ABSTRACT

To provide for rapid temperature response to changes in temperature of an air flow past the sensing end portion of a resistance sensing track (13) on a ceramic substrate (12), the resistance sensing track is applied in a meander of a predetermined length, which is spaced from contact terminal points (14) to the meander by at least the longitudinal extent (19) of the meander; two covering layers (20, 21) are provided, one (20) being thin and covering the meander and adjacent connecting tracks (15, 16), and the other (21) being thick and sturdy and retaining the plate (12) in position in a housing (1, 2), overlapping the first covering (20), but being spaced therefrom by at least half the longitudinal extent (19) of the meander.

2 Claims, 5 Drawing Figures

FAST-RESPONSE TEMPERATURE SENSOR

The present invention relates to a temperature sensor, and more particularly to a temperature sensor which is readily adaptable to cooperate with an internal combustion (IC) engine to sense the temperature of induction air being sucked into the inlet manifold of an internal combustion engine and especially for a supercharged IC engine.

BACKGROUND

To maintain a proper fuel-air mixture to an IC engine, the quantity of fuel being supplied should be made dependent, among others, on the temperature of the air being supplied to the engine. To sense the temperature, a temperature sensor is needed which is sturdy and suitable for operation in the rough environmental conditions of automative engines, and which additionally can rapidly follow changes in temperature. The temperature sensor thus must have only a low heat capacity. The thermal coupling of the temperature sensing element itself with the holder or housing must be so designed that the response speed of the sensor is unaffected by the housing or holder. Additionally, the air which is to be sensed should be supplied to the sensor in such a way that the air flow characteristic are an optimum to provide optimum sensing of the temperature. The sensing element, typically, is a sensing resistor which should be surrounded by the air flow. The sensing resistor or sensing element must, additionally, be protected from contamination, damage, or even destruction by outside mechanical influences. The measuring resistor and its contact elements must be protected against corrosion due to ambient humidity and contaminants in the air passing the sensor which, for example, may include remnants of salt spray after winter-salting of roads or the like. A sensor of this type is described and claimed in U.S. Pat. No. 4,368,453, HERDEN et al., assigned to the assignee of this application.

It is difficult to meet all these requirements since, if the measuring resistor is to have a protective coating, it should be as thin as possible so as not to interfere with high response speed, but still be of sufficient strength and thickness to properly protect the sensor. Very thin coatings on resistance elements are insufficient to properly protect the sensor, and particularly at the solder terminals, namely at the transition between the resistance layer and the solder connections, and do not form the hermetical covering over the entire sensing unit.

THE INVENTION

It is an object to provide a temperature sensor, particularly adapted to sense inlet temperature of an IC engine, and especially of a supercharged IC engine, which has fast-response speed and which is suitable for use in the rough environment of an automotive IC engine, that is, is resistant to shock, vibration, rapid temperature changes and steep temperature gradients, while providing a hermetic seal of terminal connections to prevent malfunctions due to penetration of moisture into the sensor structure.

Briefly, a plate-like substrate, for example of aluminum oxide or the like, is provided on which a temperature-responsive resistance track is formed, laid out as a meander. The track has a predetermined longitudinal extent from which connecting tracks extend towards a holding portion, remote from the sensing end of the substrate which carries the meander. The connecting tracks have a length which is at least as long as the predetermined longitudinal extent of the meander. Two protective coatings are provided, applied in mutually staggered, overlapping position on the insulating carrier and over the connection tracks. A first one of the coatings covers the meander track arrangement and a major portion of the connection tracks. It is a thin coating to provide for rapid response of the sensing portion formed by the meander track arrangement. The second coating, chemically and mechanically compatible with the first coating, is substantially thicker than the first and covers the connection tracks and the connection terminals to which external wires, terminal posts, strips or blades can be soldered. The second covering additionally forms the holding element for the substrate in a housing which is adapted to be secured at a supporting structure, for example in the induction pipe or in an air inlet duct of an internal combustion engine. The boundary line of the overlap of the second covering over the first covering is spaced from one end portion of the meander track arrangement by at least half of said predetermined distance.

The particular arrangement has the advantage that it permits secure attachment of the substrate and the sensor, reliable sealing against contamination and ingress of moisture of the contact portions of the sensing element, while poviding for rapid response to changes in temperature of air to which the sensing element is exposed since the first covering over the sensing end portion of the meander itself can be made quite thin, only covering a track arrangement which, preferably, is applied by thin-film technology.

DRAWINGS

Figure 1:
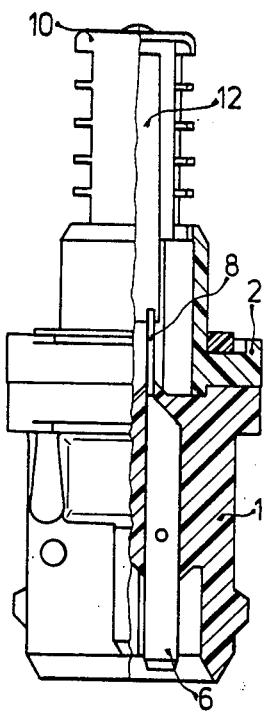
FIG. 1 is a side view of a temperature sensor, partly in section.
Figure 2:
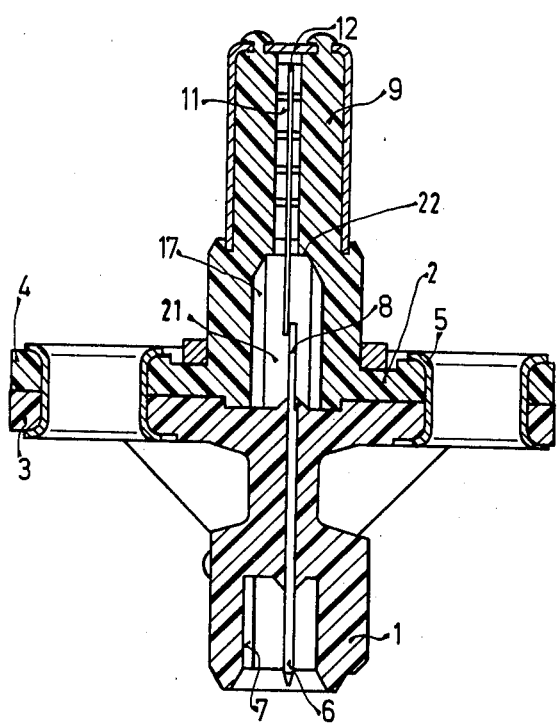
FIG. 2 is a section of the sensor of FIG. 1, rotated 90° with respect thereto.
Figure 3:
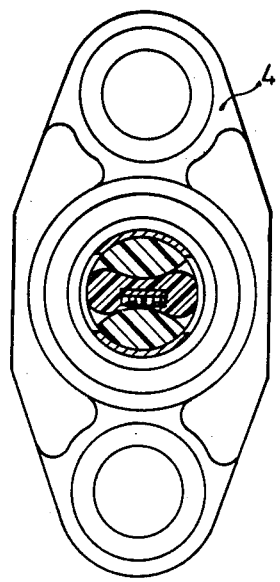
FIG. 3 is a sectional end view taken along line III—III of FIG. 1 and omitting structural details not necessary for an understanding of the invention.

The temperature sensor illustrated in FIGS. 1-3 is designed for association with the inlet or induction pipe of an IC engine (not shown). It has a temperature operating range of between −40° C. to 180° C. It is made of thermosetting plastic and has a two-part injection-molded housing. A lower portion 1 and an upper portion 2 are assembled together, both parts having an enlarged flange 3, 4 (FIG. 2) and held together by through-hollow rivets 5. The openings defined by the rivets 5 may, simultaneously, form attachment holes for securing the sensor in the induction pipe of an IC engine.

Two terminal blades 6 extend from the lower portion 1, being molded into the thermoplastic thereof. They are located within a recess 7 for connection to a suitable plug—not shown, which can fit into the recess 7. The blades 6, suitably retained within the portion 1 as well known, are flattened to have connecting portions 8 at their upper ends (see FIGS. 1 and 2) to the sensing element itself.

The upper portion 2 is formed with two upwardly extending carrier columns 9, spaced from each other, and retained in position by a metal cover cap 10 extending over the two upstanding columns. The columns extend in the form of fingers and are shaped to form an air duct in which air flowing around the columns is restricted in its path so that the air speed of air passing thereabout is increased. This increases the response speed of the sensor. The cover cap 10 has holes 11 punched therein to form windows in order to permit air to pass into the interior of the space between the columns or fingers 9.

The space between the columns or fingers 9 retains a sensing element—see FIG. 14—which is placed on a substrate 12, for example made of a ceramic such as $AlO_2$ of about 0.25 mm thickness. The cap 10 should be replaced by other holding elements which take over the function of protection of the sensor and retention of the fingers or columns 9 with respect to each other; for example, separate metal rings can be placed in grooves located at the outside thereof, the rings being positioned at those locations where solid portions between the punched-out window are formed when using the cap 10.

Figure 4:
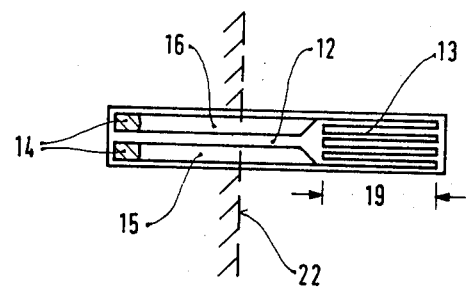
FIG. 4 is a top view of a substrate and temperature-sensitive resistance track of the sensing element of the sensor.

The temperature sensing element itself is the ceramic insulating place 12 on which temperature-sensitive resistance tracks are positioned. As best seen in FIG. 4, the track has a meander shape 13, with a longitudinal extent 19. The track is preferably made of a vapor-deposited tantalum-nickel layer with an area resistance of 0.47 ohms±10%. Using a meander of four times the length 19, and the aforementioned TaNi resistance, and with a track width of 75 μm, a resistance of 1 kilo ohm will arise between two connecting tracks 15, 16 extending longitudinally along the edges of the insulating plate 12. The connecting tracks, likewise, are applied by thin-film technology. They are connected at their terminal ends at solder connections or joints 14 with the blade terminals 8 of the blade 6.

The region of the connecting tracks 15, 16 adjacent the solder terminals 14 to the connecting blades 8 is molded in or covered by a cover layer or coating 21. The cover layer or coating 21 is a hardening or curing-type pouring casting plastic, poured into a cavity 17 formed in the upper housing portion 2, simultaneously securing the insulating plate 12 securely in the housing and forming a corrosion-protective layer for the solder contacts 14.

The length of the distance between the end of the meander track 13 and the solder terminal 14, shown at 24 in FIG. 4, is at least as long as the longitudinal extent 19 of the meander tracks 13, preferably longer. The curable casting compound 21 extends over the connecting tracks 15, 16 to a boundary line 22 which is spaced from the inner end portion of the meander track 13 by at least half the length 19 of the meander track. Thus, distance 23 (FIG. 5) is half or somewhat more than half the distance 19.

Figure 5:
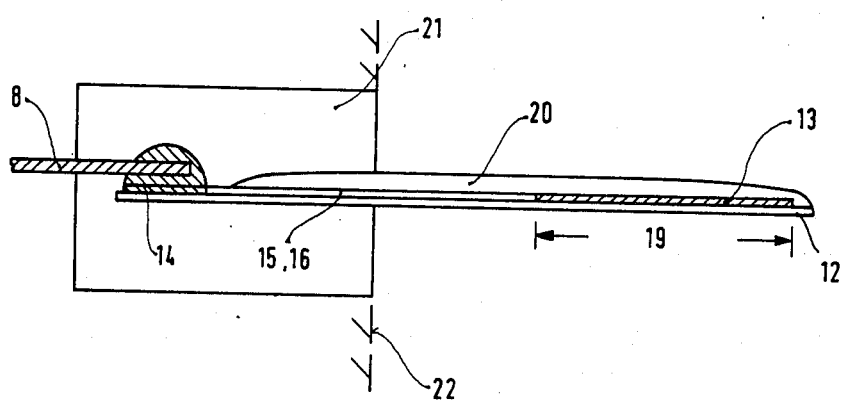
FIG. 5 is a side view of the structure of FIG. 4, illustrating the overlapping layers in schematic configuration, and to a substantially enlarged scale.

The meander track 13 as well as the major portion of the connecting tracks or path 15, 16 are covered by a thin protective insulating coating 20 (FIG. 5). The coatings 20, 21 must be of compatible materials. An overlap between the coatings 20, 21 insures a tight seal at the boundary 22, so that moisture and contaminants are effectively prevented from penetrating the connecting end portions of the sensor. The covering layer 20 for the resistance meander portion is, preferably, an expoxy resin; the casting compound 21 then, preferably, likewise is an expoxy resin which may include up to 70% titanium oxide, and uses an amine-based curing or hardening compound.

Mathematically expressed, the distance 19 (FIG. 5) is at least two times the distance 23; and the distance 24 (FIG. 4) is at least the same as the distance 19, and preferably somewhat longer. Thus, the resistors 13, in meander-shaped configuration, and the contact terminals 14 are spaced from each other by more than the length 19 of the longitudinal extent of the resistance meander track; the connecting paths or tracks 15, 16 are made as wide as possible.

The distance relationships of the contact points 14 with respect to the meander, and the overlap of the respective covering materials 20, 21, and position of the boundary 22, are all matched to each other for specific reasons:

(1) The resistance meander layer 13 and the contact terminals 14 are protected against corrosive attack by different materials, which is made possible by introducing a sufficiently long intermediate range or region therebetween which permits overlap of the protective layer 20, made thin for fast response, and the layer 21, made sturdy to hold the sensing element 12 and its electrical tracks thereon in position, while protecting the connecting points. Penetration of moisture or dampness along the overlapping surface of the materials 20, 21 is effectively prevented.

(2) The portion of the insulating plate 12 which carries the contact regions 14 is used for mechanically stable holding of the substrate 12 and connection to the housing. The boundary line of the holder is spaced by more than half the longitudinal extent 19 of the meander from the meander—see dimension 23 (FIG. 5). This spacing prevents interference of the response speed of the sensor by possible thermal coupling of the measuring resistor with the holding region or, in other words, the casting mass 21. The thermal effect of the casting mass 21 on the response speed thus can be held to a value which is so small as to be neglectable.

Various changes and modifications may be made within the scope of the inventive concept.

The material for cover 20 may be that of any well known, and commercial protective coating which is compatible with the coating 21. Coatings 20 made of epoxy—novolac basis, or on esterimide basis are suitable and compatible. The coating 20 is applied in a dipping process. The viscosity and the pulling speed of coating 20 are so matched, e.g. by suitable proportioning of thinner or solvent, that the protective layer 20 will have a thickness in the range of between about 5 μm. This result is obtained, for example, by using a cover 20 based on esterimide as follows: 100 parts (by weigh) resin F 93 K.A. are mixed with 100 parts (by weight) of hardener F 93 K.B. and pulled at a speed of 1 cm/min. The resin and the hardener are commercially available under the given designations from the firm of Beck-Electrical Insulation Systems, 2000 Hamburg 28, Fed. Rep. Germany.

I claim:

1. Fast-response temperature sensor, particularly for use with an internal combustion engine, having
a housing (1, 2, 9, 10) defining an air duct and a cavity (17) therein, joined to the air duct;
apertures (11) formed in the housing and extending therethrough and communicating with the air duct;
connecting terminals (6, 8) secured in the housing;

a thermal-electrical elongated sensing element positioned in the cavity and secured in the housing, comprising
an insulating carrier (12) extending into the air duct and into the cavity;
a temperature-sensitive resistance track (13) deposited on the carrier and having connection means (14) for connection of the resistance track to the terminal (6, 8), said temperature-sensitive resistance track being located adjacent an end portion of the insulating carrier and arranged in meander shape; wherein
the resistance track comprises a thin-film track arrangement having a predetermined longitudinal extent (19);
connection tracks (15, 16) are provided, having a length (24) at least as long as said predetermined longitudinal extent (19) extending from one end portion of said meander-shaped track arrangement to the connection means (14);
and two protective coatings (20, 21) are provided, applied, respectively, in longitudinally staggered, and mutually overlapping position on the insulating carrier and over said track arrangement and the connection means;
a first one of said coverings (20) covering said meander-shaped track arrangement and a major portion of the connection means (15, 16) and consisting of an epoxy resin of about 5 $\mu$m thickness;
and the second (21) of said coverings comprising an epoxy resin casting compound compatible with the first covering (20) and filling said cavity (17), said second covering extending over the connection means and the adjacent portions of the terminals secured thereto and forming a holding and attachment body to secure the insulating carrier in the housing;
and wherein the longitudinal extent is at least twice the distance (23) between the boundary line (22) of overlap of the second covering (21) over the first covering (20).

2. Sensor according to claim 1, wherein the in the region of the meander track arrangement, is shaped with converging surfaces to increase the air speed of air flow past the meander track arrangement.

* * * * *